United States Patent
Ozue et al.

(10) Patent No.: US 6,801,379 B2
(45) Date of Patent: Oct. 5, 2004

(54) MULTI-MAGNETIC RECORDING HEAD, AND MAGNETIC RECORDING METHOD AND MAGNETIC RECORDING APPARATUS USING THE SAME

(75) Inventors: Tadashi Ozue, Kanagawa (JP); Yutaka Soda, Kanagawa (JP)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 10/041,333

(22) Filed: Jan. 8, 2002

(65) Prior Publication Data

US 2002/0135918 A1 Sep. 26, 2002

(30) Foreign Application Priority Data

Jan. 15, 2001 (JP) .................................... P2001-006750

(51) Int. Cl.[7] .............................. G11B 5/29; G11B 5/02
(52) U.S. Cl. ........................ 360/55; 360/119; 360/121; 360/126; 360/127
(58) Field of Search ......................... 360/55, 121, 125, 360/126, 119, 127, 251, 319, 324

(56) References Cited

U.S. PATENT DOCUMENTS

| | | | | |
|---|---|---|---|---|
| 4,001,890 A | * | 1/1977 | Kayser | 360/121 |
| 4,622,615 A | * | 11/1986 | Desserre | 360/121 |
| 4,685,005 A | * | 8/1987 | Fields, Jr. | 360/53 |
| 5,161,299 A | * | 11/1992 | Denison et al. | 29/603.13 |
| 5,598,309 A | * | 1/1997 | Tolman | 360/126 |
| 6,108,167 A | * | 8/2000 | Tateyama et al. | 360/126 |

FOREIGN PATENT DOCUMENTS

JP          57-183617       * 12/1982

* cited by examiner

Primary Examiner—David Hudspeth
Assistant Examiner—Natalia Figueroa
(74) Attorney, Agent, or Firm—Sonnenschein, Nath & Rosenthal LLP

(57) ABSTRACT

The present invention provides a multi-magnetic recording head capable of increasing a magnetic recording density of information recorded on a magnetic recording medium. The multi-magnetic recording head includes a substrate, a pair of first thin film magnetic poles with a specific gap put therebetween, which are stacked over the substrate, and a pair of second thin film magnetic poles with a specific gap put therebetween, which are stacked over the pair of first thin film magnetic poles, wherein the pair of first thin film magnetic poles and the pair of second thin film magnetic poles are offset from each other in the direction nearly perpendicular to the stacking direction.

15 Claims, 10 Drawing Sheets

MULTI-MAGNETIC RECORDING HEAD, AND MAGNETIC RECORDING METHOD AND MAGNETIC RECORDING APPARATUS USING THE SAME

RELATED APPLICATION DATA

The present application claims priority to Japanese Application(s) No(s). P2001-006750 filed Jan. 15, 2001, which application(s) is/are incorporated herein by reference to the extent permitted by law.

BACKGROUND OF THE INVENTION

The present invention relates to a multi-magnetic recording head, and a magnetic recording method and a magnetic recording apparatus, which use the multi-magnetic recording head. In particular, the present invention relates to a technique of increasing a magnetic recording density of information recorded by a magnetic recording head by configuring the magnetic recording head as a multi-magnetic recording head including a multiplicity of thin film magnetic recording heads.

In recent years, higher magnetic recording density of information recorded on magnetic recording media has been required to increase magnetic recording capacities of the magnetic recording media, and to meet such a requirement, there have been adopted thin film magnetic recording heads suitable for forming narrower recording tracks on magnetic recording media.

To realize higher magnetic recording densities of information recorded on magnetic recording media, that is, larger magnetic recording capacities of the magnetic recording media, it has been required to carry out multi-channel magnetic recording by using a multi-magnetic recording head including a multiplicity of thin film magnetic recording heads.

For example, a known multi-magnetic recording head is configured such that a plurality of thin film magnetic recording heads are arranged on one head substrate (head chip) in such a manner as to be spaced from each other at suitable intervals in the width direction (perpendicular to the gap direction).

FIG. 1 shows a multi-magnetic recording head "a" including two thin film magnetic recording heads "b" arranged in parallel in the width direction.

Each thin film magnetic recording head "b" is composed of a lower magnetic pole "f" and an upper magnetic pole "g" which are stacked on a magnetic shield layer "e" formed on a non-magnetic substrate "c" via an insulating layer "d". These lower magnetic pole "f" and the upper magnetic pole "g" are two tip portions of a core "h" which is made from a magnetic material and is formed into an approximately U-shape in a side view. A specific gap "i" is formed between these lower magnetic pole "f" and the upper magnetic pole "g".

A coil "j" is wound around the core "h". When a current is applied to the coil "j", a magnetic field is generated in the gap "i" between the lower magnetic pole "f" and the upper magnetic pole "g", so that a recording track Tr is formed on a magnetic recording medium (magnetic tape or magnetic disk) "k" running in contact with or in the vicinity of the gap "i".

The above-described related art multi-magnetic recording head "a", however, has a problem that since a gap between the two thin film magnetic recording heads "b" cannot be made small, a track pitch Tp of the recording tracks Tr formed on the magnetic recording medium "k" becomes relatively large. Accordingly, the related art multi-magnetic recording head cannot record information on a magnetic recording medium at a higher recording density.

To be more specific, since the coil "j" wound around the core "h" necessarily projects sideways from the core "h", the adjacent thin film magnetic recording heads "b" cannot be arranged in such a manner that the gaps "i" are close to each other because of interference of the coils "j" with each other (see FIG. 2).

For this reason, the recording tracks Tr formed by the thin film magnetic recording heads "b" of the multi-magnetic recording head "a" cannot be made close to each other, and thereby the track pitch Tp of the recording tracks Tr cannot be made narrow. Accordingly, the related art multi-magnetic recording head cannot record information on a magnetic recording medium at a higher recording density (see FIG. 3).

SUMMARY OF THE INVENTION

An object of the present invention is to provide a multi-magnetic recording head including a multiplicity of thin film magnetic recording heads, which is capable of increasing a magnetic recording density of information recorded on a magnetic recording medium.

To achieve the above object, according to a first aspect of the present invention, there is provided a multi-magnetic recording head including: a substrate; a pair of first thin film magnetic poles with a specific gap put therebetween, which are stacked over the substrate; and a pair of second thin film magnetic poles with a specific gap put therebetween, which are stacked over the pair of first thin film magnetic poles; wherein the pair of first thin film magnetic poles and the pair of second thin film magnetic poles are offset from each other in the direction nearly perpendicular to the stacking direction.

According to a second aspect of the present invention, there is provided a magnetic recording method of substantially simultaneously forming a plurality of recording tracks by using a multi-magnetic recording head, the multi-magnetic recording head including: a substrate; a pair of first thin film magnetic poles with a specific gap put therebetween, which are stacked over the substrate; and a pair of second thin film magnetic poles with a specific gap put therebetween, which are stacked over the pair of first thin film magnetic poles; wherein the pair of first thin film magnetic poles and the pair of second thin film magnetic poles are offset from each other in the direction nearly perpendicular to the stacking direction.

According to a third aspect of the present invention, there is provided a magnetic recording apparatus including a multi-magnetic recording head, the multi-magnetic recording head including: a substrate; a pair of first thin film magnetic poles with a specific gap put therebetween, which are stacked over the substrate; and a pair of second thin film magnetic poles with a specific gap put therebetween, which are stacked over the pair of first thin film magnetic poles; wherein the pair of first thin film magnetic poles and the pair of second thin film magnetic poles are offset from each other in the direction nearly perpendicular to the stacking direction.

With these configurations, since a plurality of thin film magnetic recording heads are stacked to each other, a width W of the thin film magnetic recording heads can be made small with its accuracy kept at a desirable value, and also an offset between the thin film magnetic recording heads in the width direction, that is, an arrangement pitch P of the thin film magnetic recording heads in the width direction can be made small with its accuracy kept at a desirable value. As a result, the multi-magnetic recording head, and the magnetic recording method and the magnetic recording apparatus, which use the multi-magnetic recording head, according to the present invention are advantageous in increasing a recording density of information recorded on a magnetic recording medium.

According to a fourth aspect of the present invention, there is provided a magnetic recording apparatus including: at least two sets of multi-magnetic recording heads each of which includes a plurality of thin film magnetic recording heads spaced from each other at specific intervals; wherein recording tracks with an unrecorded portion put therebetween are formed by the thin film magnetic recording heads of one of the multi-magnetic recording heads, and a recording track is formed on the unrecorded portion by at least one of the thin film magnetic recording heads of another of the multi-magnetic recording heads.

With this configuration, it is possible to simultaneously form a plurality of recording tracks, and hence to efficiently increase a recording speed of the magnetic recording apparatus.

DETAILED DESCRIPTION OF THE PREFERRED EMBODIMENTS

Hereinafter, preferred embodiments of the present invention will be described in detail with reference to the accompanying drawings.

A first embodiment of the present invention will be described with reference to FIGS. 4 and 5. A multi-magnetic recording head according to this embodiment includes two thin film magnetic recording heads. The thin film magnetic recording heads are offset from each other in the direction perpendicular to a gap direction, and end portions of magnetic poles of the thin film magnetic recording heads are overlapped to each other.

Figure 1:
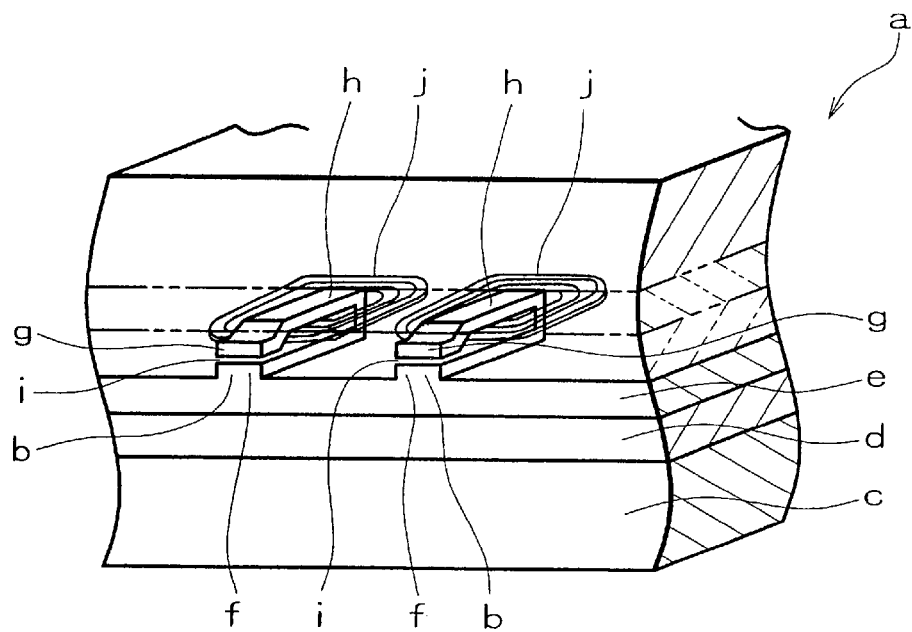
FIG. 1 is a schematic perspective view of a related art multi-magnetic recording head.
Figure 2:
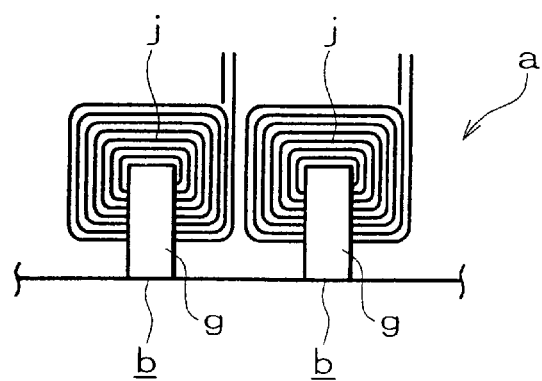
FIG. 2 is a schematic plan view of the related art multi-magnetic recording head shown in FIG. 1.
Figure 3:
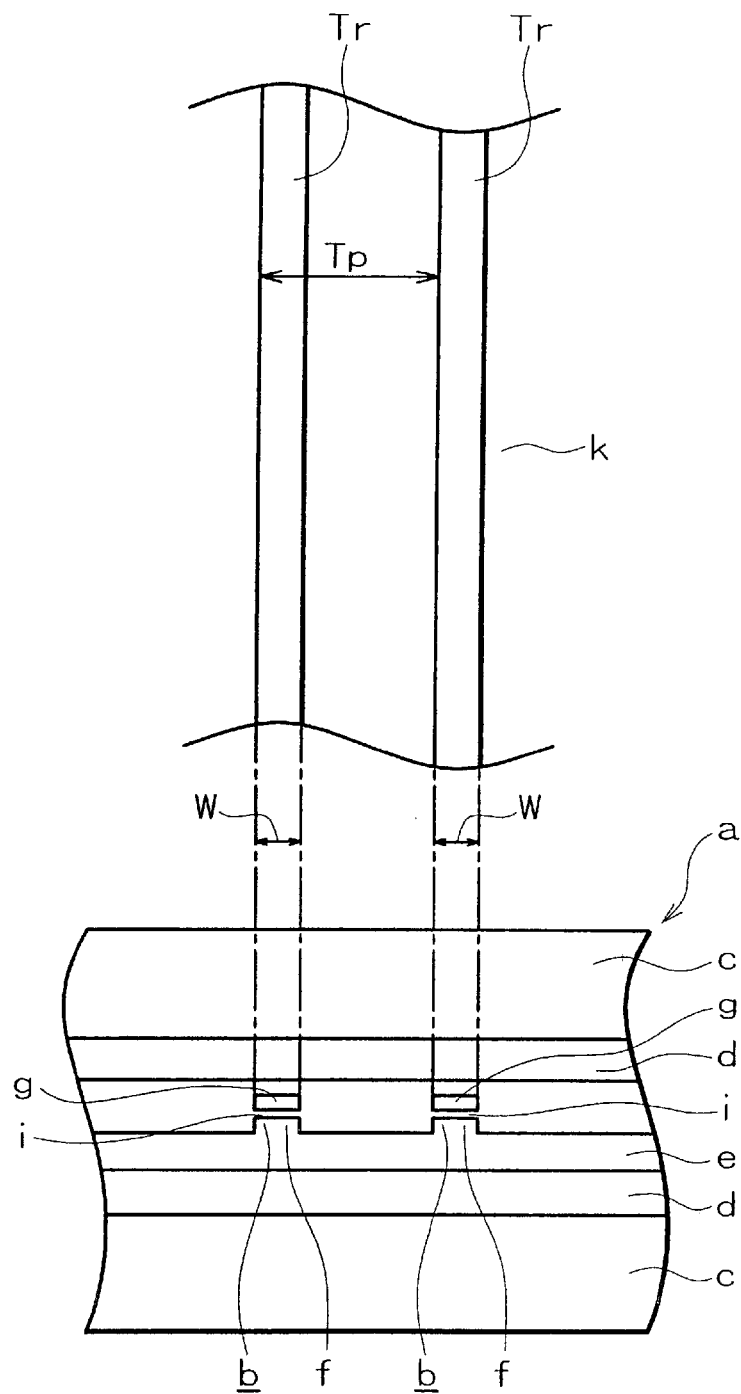
FIG. 3 is a view showing a positional relationship between thin film magnetic recording heads of the related art multi-magnetic recording head shown in FIG. 1 and recording tracks.
Figure 4:
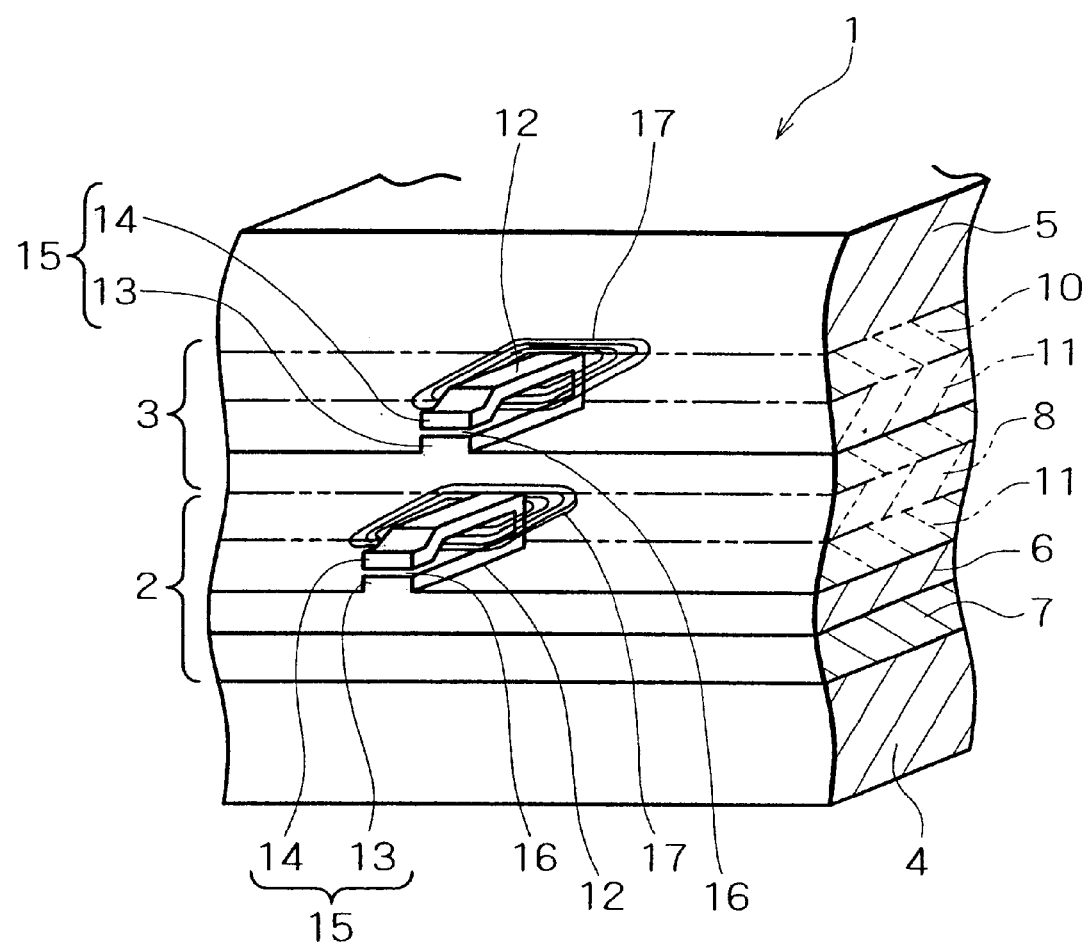
FIG. 4 is a schematic perspective view showing a multi-magnetic recording head as a first embodiment of the present invention.
Figure 5:
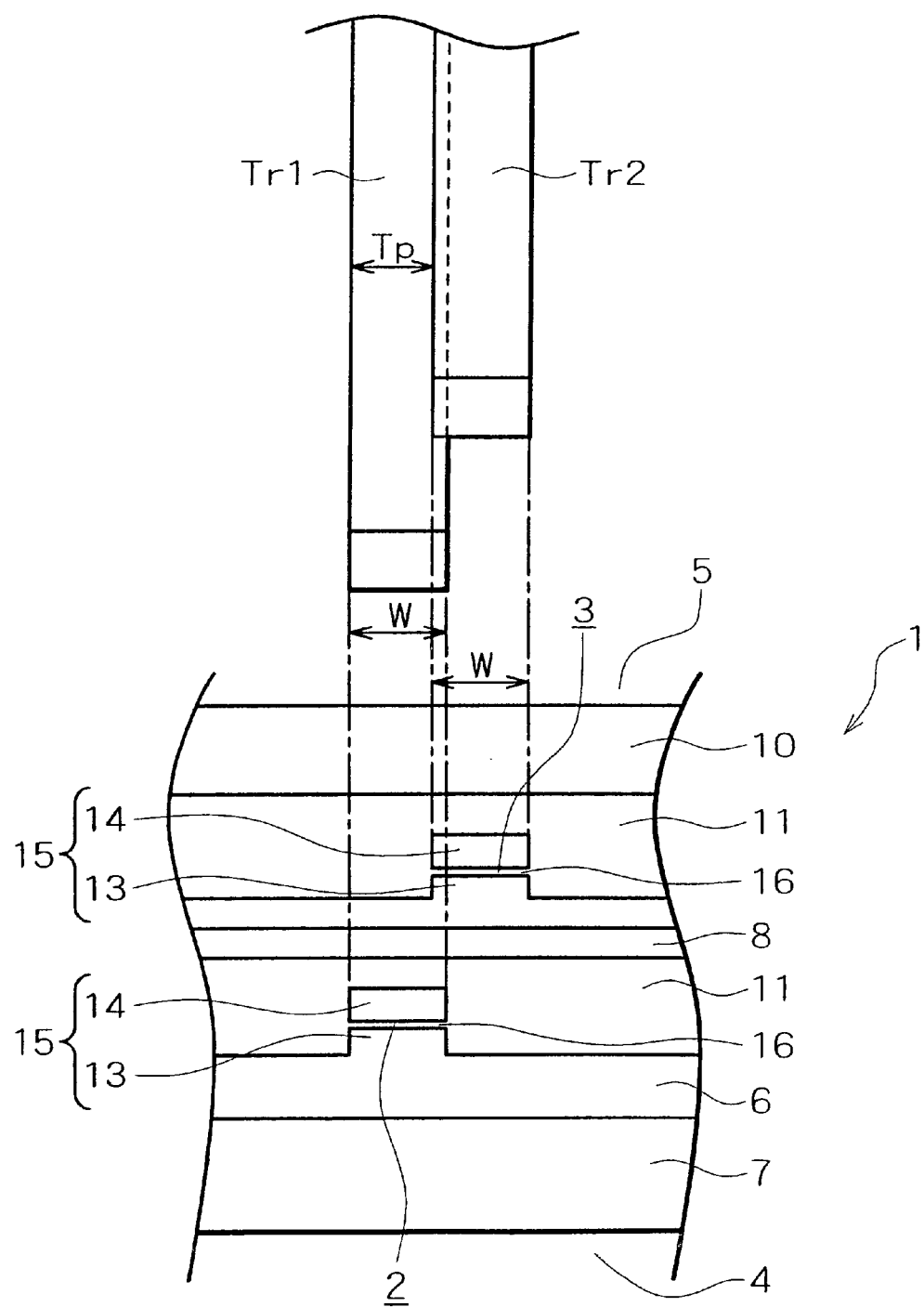
FIG. 5 is a view showing a positional relationship between thin film magnetic recording heads of the multi-magnetic recording head shown in FIG. 4 and recording tracks.

FIG. 4 is an enlarged perspective view showing a schematic configuration of a multi-magnetic recording head 1 according to this embodiment from the side, being in contact with a magnetic recording medium, of the multi-magnetic recording head 1.

As shown in FIG. 4, the multi-magnetic recording head 1 is configured such that a first thin film magnetic recording head 2 and a second thin film magnetic recording head 3 are held between two non-magnetic substrates 4 and 5 in a stacking direction.

To be more specific, the multi-magnetic recording head 1 is configured by stacking the lower non-magnetic substrate 4, a lower insulating layer 7, a lower magnetic shield layer 6, the first thin film magnetic recording head 2, an intermediate magnetic shield layer 8, the second thin film magnetic recording head 3, an upper insulating layer 10, and the upper non-magnetic substrate 5 in this order. It is to be noted that as shown in FIG. 5, each of the thin film magnetic recording heads 2 and 3 occupies only a small region in the direction perpendicular to the stacking direction and is covered with a protective layer 11.

Each of the lower non-magnetic substrate 4 and the upper non-magnetic substrate 5 is typically made from "altic" (AlTiC, sintered body of alumina and titanium carbide)). Each of the upper and lower insulating layers 7 and 10 is typically made from alumina ($Al_2O_3$). The protective layer 11 is typically made from alumina ($Al_2O_3$).

The first and second thin film magnetic recording heads 2 and 3 have configurations being substantially the same as those of the above-described related art thin film magnetic recording heads. That is to say, tip portions of a core 12 formed into an approximately U-shape form a lower magnetic pole 13 and an upper magnetic pole 14 of each of the first and second thin film magnetic recording heads 2 and 3. These lower magnetic pole 13 and the upper magnetic pole 14 constitute a pair of magnetic poles 15. A gap 16, which is formed between the pair of magnetic poles 15, is set to, for example, g=0.1 $\mu$m.

Each of the magnetic shield layers 6 and 8 and the core 12 is made from a high magnetic material, examples of which may include Ni—Fe (Permalloy), Si—Al—Fe (Sendust), or an amorphous iron core material (high permeability thin strip).

The lower magnetic shield layer 6 is integrated with the lower magnetic pole 13 of the first thin film magnetic recording head 2. Accordingly, as shown in FIG. 4, the lower magnetic pole 13 is integrally formed, in the shape of a projection rib, on an upper surface of the lower magnetic shield layer 6.

The lower magnetic pole 13 of the second thin film magnetic recording head 3 is formed into the same shape as that of the integral body formed by the lower magnetic pole 13 and the lower magnetic shield layer 6 in the first thin film magnetic recording head 2, and is stacked on the intermediate magnetic shield layer 8. In addition, the lower magnetic pole 13 in the second thin film magnetic recording head 3 may be integrated with the intermediate magnetic shield layer 8. In other words, the intermediate magnetic shield layer 8 can serve as the lower magnetic pole 13 of the second thin film magnetic recording head 3.

A coil 17 is wound around the core 12. When a current is applied to the coil 17, a magnetic field is generated in the gap 16, so that a recording track Tr having a width W nearly equal to a width W of the pair of magnetic poles 15 is formed on the magnetic recording medium 18.

Since the thin film magnetic recording heads 2 and 3 are offset from each other in the stacking direction as described above, the coils 17 thereof do not interfere with each other. Accordingly, the thin film magnetic recording heads 2 and 3 can be arranged in such a manner as to have any positional relationship therebetween in the direction (width direction) perpendicular to the stacking direction. However, the arrangement of a plurality (two in this embodiment) of the thin film magnetic recording heads 2 and 3 at the same position in the width direction is useless, and therefore, as will be described later, the thin film magnetic recording heads 2 and 3 are arranged in such a manner as to be offset from each other in the width direction.

According to the first embodiment, the first and second thin film magnetic recording heads 2 and 3 are offset from each other in the direction perpendicular to the direction of the gap 16 (the direction perpendicular to the stacking direction), and end portions of the pairs of magnetic poles 15, adjacent to each other as seen in the stacking direction, of the first and second thin film magnetic recording heads 2 and 3 are overlapped to each other as seen in the stacking direction. Accordingly, an arrangement pitch P of the thin film magnetic recording heads 2 and 3 is smaller than the width W of the thin film magnetic recording heads 2 and 3 (see FIG. 5). In addition, the width W of the pair of the magnetic poles 15 is set to 1.2 μm, and the arrangement pitch P is set to 1.0 μm. The configuration of the multi-magnetic recording head in which the two thin film magnetic recording heads 2 and 3 are offset from each other in the width direction and end portions thereof are overlapped to each other relates to that described in each of claims 4, 7 and 12.

With this configuration, when information is recorded on the magnetic recording medium 18 (magnetic tape or magnetic disk) running in contact with or in the vicinity of the multi-magnetic recording head 1, a first recording track Tr having a track width W of 1.2 μm is formed on the magnetic recording medium 18 by the first thin film magnetic recording head 2, and then a second recording track Tr having a track width W of 1.2 μm is formed on the magnetic recording medium 18 in such a manner as to be overlapped to the first recording track Tr by 0.2 μm by the second thin film magnetic recording head 3. Accordingly, the width of the first recording track Tr becomes W=1.0 μm. That is to say, a narrower recording track Tr can be formed.

In such a multi-magnetic recording head 1, which includes a plurality (multiplicity) of the thin film magnetic recording heads 2 and 3, since the thin film magnetic recording heads 2 and 3 are arranged in such a manner that the pairs of the magnetic poles 15 thereof are overlapped to each other in the width direction, a track pitch Tp of the recording tracks Tr can be made smaller than the width W of the pair of the magnetic poles 15. This contribute to higher density recording of information on the magnetic recording medium.

The configuration of this embodiment, in which the intermediate magnetic shield layer 8 is common to the thin film magnetic recording heads 2 and 3, relates to that described in each of claims 2 and 10. It is to be noted that the intermediate magnetic shield layer 8 may be provided in such a manner as to be adjacent to each of the thin film magnetic recording heads 2 and 3.

Figure 6:
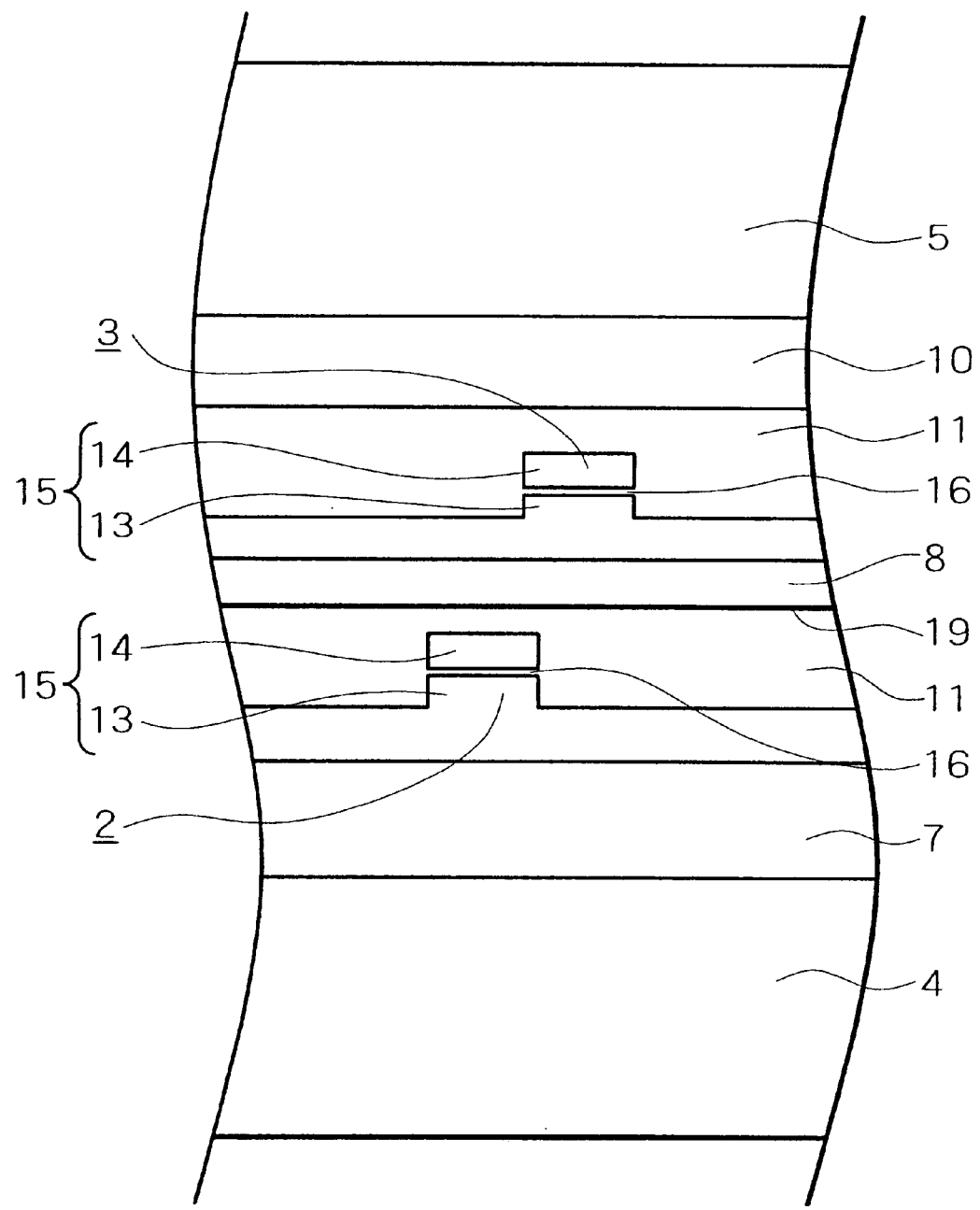
FIG. 6 is a schematic front view showing a modification of the multi-magnetic recording head shown in FIG. 4, in which a magnetic flux shield layer is interposed between an intermediate magnetic shield layer and the upper thin film magnetic recording head.

FIG. 6 is a modification of the intermediate magnetic shield layer 8, wherein a magnetic flux shield layer 19 is interposed between the lower magnetic pole 13 of the second thin film magnetic recording head 3 and the intermediate magnetic shield layer 8.

The provision of the magnetic flux shield layer 19 between the intermediate magnetic shield layer 8 and the lower magnetic pole 13 of the second thin film magnetic recording head 3 is effective to prevent occurrence of crosstalk between the first and second thin film magnetic recording heads 2 and 3. Such a configuration relates to that described in each of claims 3 and 11.

A second embodiment of the multi-magnetic recording head of the present invention will be described with reference to FIG. 7.

The second embodiment is different from the first embodiment in that the two thin film magnetic recording heads 2 and 3 are offset from each other in the width direction and the pairs of magnetic poles of the thin film magnetic recording heads 2 and 3 are arranged in such a manner as not to be overlapped to each other as seen in the stacking direction. Accordingly, only an essential portion is shown in the figure and only the above different point will be described below. In the figure, parts corresponding to those described in the first embodiment are designated by the same reference numerals and the overlapped description thereof is omitted.

Figure 7:
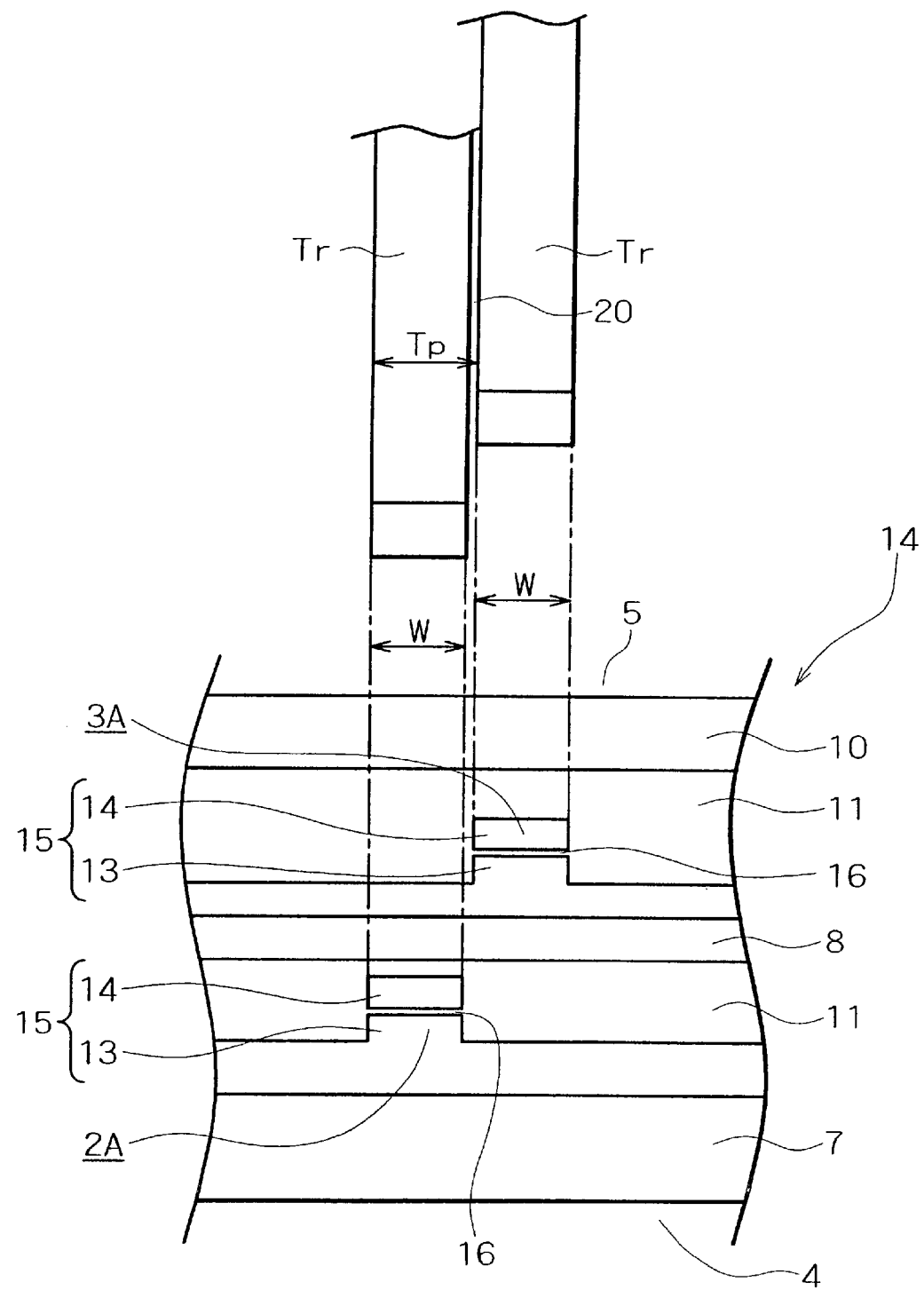
FIG. 7 is a view of a multi-magnetic recording head as a second embodiment of the present invention, showing a positional relationship between thin film magnetic recording heads and recording tracks.

As shown in FIG. 7, in a multi-magnetic recording head 1A according to this embodiment, a first thin film magnetic recording head 2A and a second thin film magnetic recording head 3A are arranged in such a manner as not to be overlapped to each other as seen in the stacking direction. A gap between the two thin film magnetic recording heads 2A and 3A is typically set to 0.2 μm.

With this configuration, recording tracks Tr having a width W=1.2 μm and a track pitch Tp=1.4 μm are recorded on a magnetic recording medium 18 by the multi-magnetic recording head 1A. A guard band 20 having a width of 0.2 μm is formed between a recording track Tr1 recorded by the first thin film magnetic recording head 2A and a recording track Tr2 recorded by the second thin film magnetic recording head 3A. As a result, it is possible to prevent occurrence of crosstalk between the two recording tracks Tr1 and Tr2.

The magnetic recording heads according to the first and second embodiments can be each applied not only to a helical scan type magnetic recording head for a magnetic tape but also to a fixed head, and further to a magnetic recording head for a magnetic disk such as an HDD. In the case of applying the present invention to an HDD, only one non-magnetic substrate may be provided, and a head slider usually serves as such a non-magnetic substrate.

A third embodiment of the multi-magnetic recording head of the present invention will be described with reference to FIGS. 8 to 12.

In this embodiment, a plurality (for example, two) of multi-magnetic recording heads each including a plurality (for example, two) of thin film magnetic recording heads are provided on a rotary drum, and therefore, a magnetic recording medium used in this embodiment is a magnetic tape.

Figure 8:
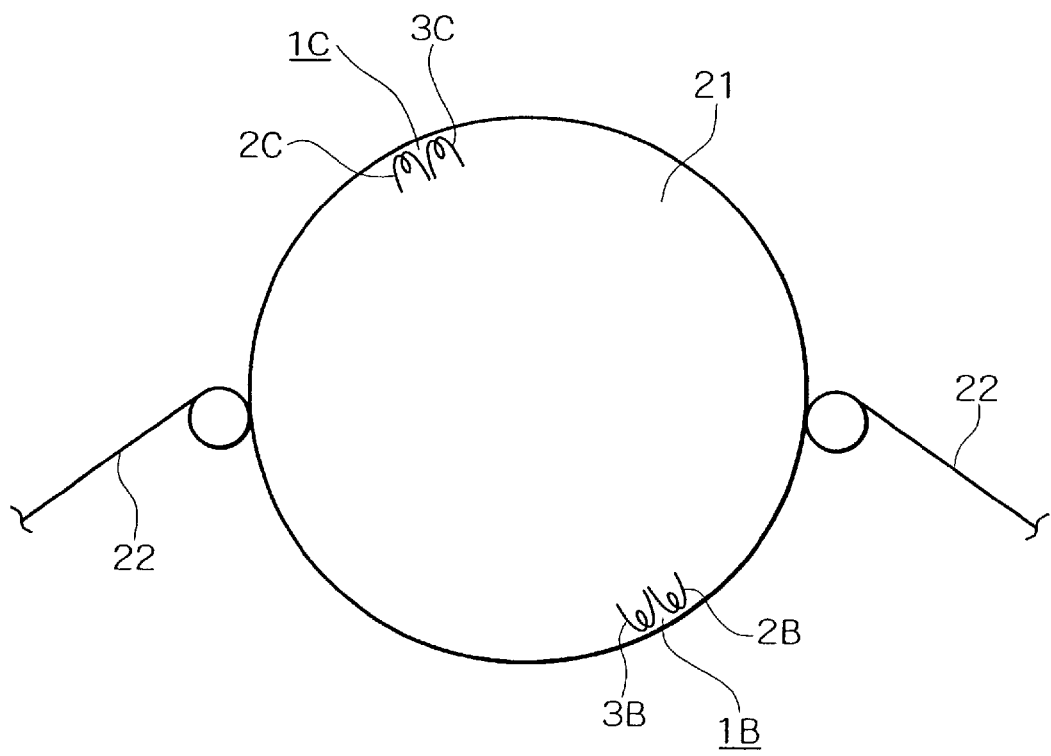
FIG. 8 is a schematic plan view showing, in cooperation of FIGS. 9 and 10, a set of multi-magnetic recording heads as a third embodiment of the present invention.

FIG. 8 shows a configuration of the third embodiment in which two multi-magnetic recording heads 1B and 1C are arranged on one rotary drum 21 in such a manner as to be spaced from each other at an interval of 180° in the circumferential direction. Such a configuration relates to that described in claim 15.

The multi-magnetic recording head 1B includes two thin film magnetic recording heads 2B and 3B, and the multi-magnetic recording head 1C includes two thin film magnetic recording heads 2C and 3C. The configuration of the multi-magnetic recording head 1B is nearly equal to that of the multi-magnetic recording head 1C, and therefore, the configuration of the multi-magnetic recording head 1B and a difference between the multi-magnetic recording heads 1B and 1C will be described below.

The configuration of the multi-magnetic recording head 1B is similar to that described in each of the first and second embodiments. That is to say, the two thin film magnetic recording heads 2B and 3B are stacked between two non-magnetic substrates 4B and 5B in such a manner as to be offset from each other in the width direction.

The two thin film magnetic recording heads 2B and 3B are formed at the same azimuth angle (for example, +azimuth angle). An offset (or gap) G between the thin film magnetic recording heads 2B and 3B in the width direction is nearly equal to a width W of the thin film magnetic recording heads 2B and 3B (W=G).

Figure 9:
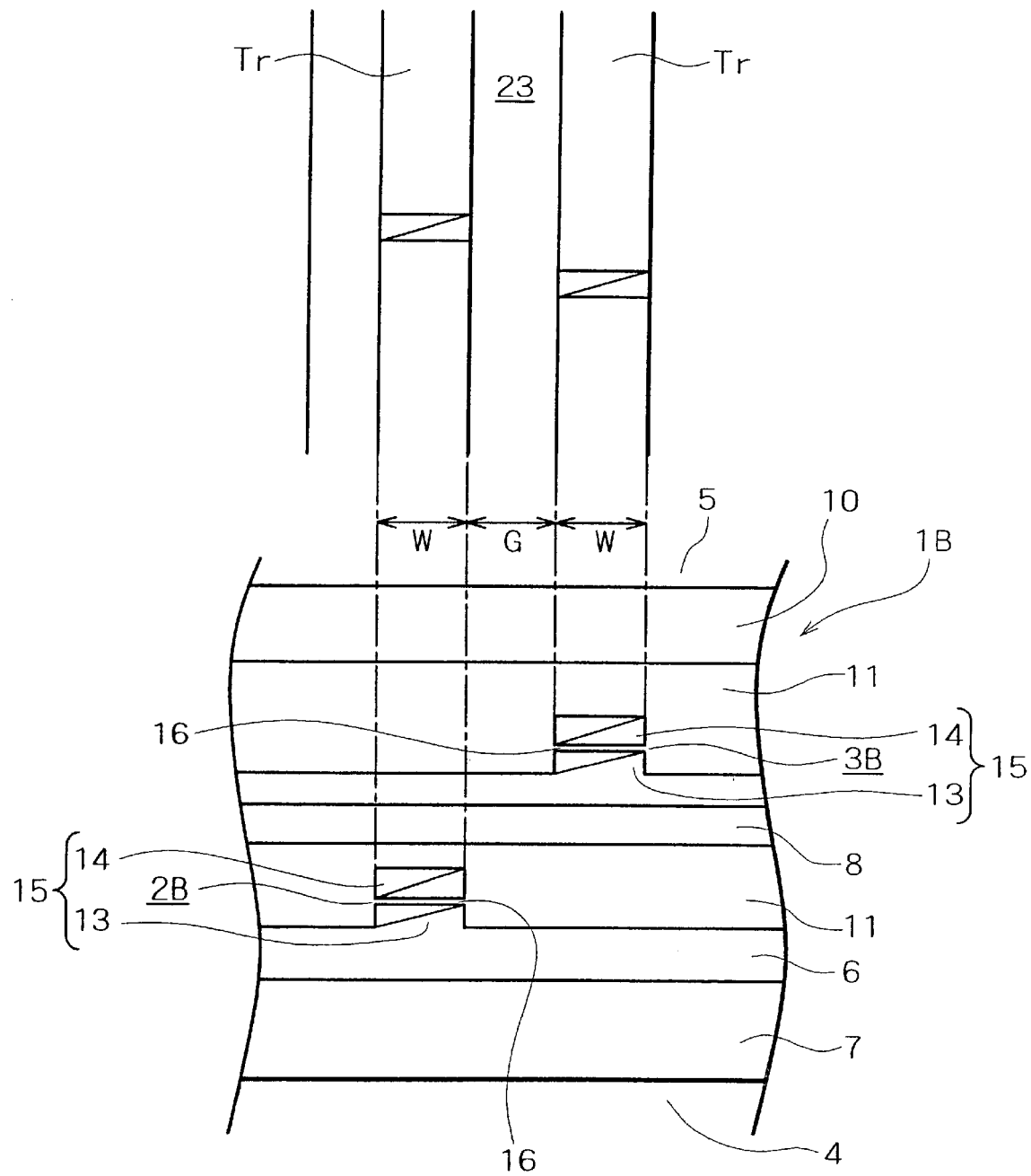
FIG. 9 is a view showing a positional relationship between thin film magnetic recording heads of one multi-magnetic recording head shown in FIG. 8 and recording tracks.

By the two thin film magnetic recording heads 2B and 3B, two recording tracks Tr each having a width nearly equal to the width W of the thin film magnetic recording heads 2B and 3B are recorded on a magnetic tape 22 in such a manner as to be separated from each other by the gap G nearly equal to the width W of the thin film magnetic recording heads 2B and 3B. Accordingly, as shown in FIG. 9, an unrecorded portion 23 is formed between both the recording tracks Tr.

Figure 10:
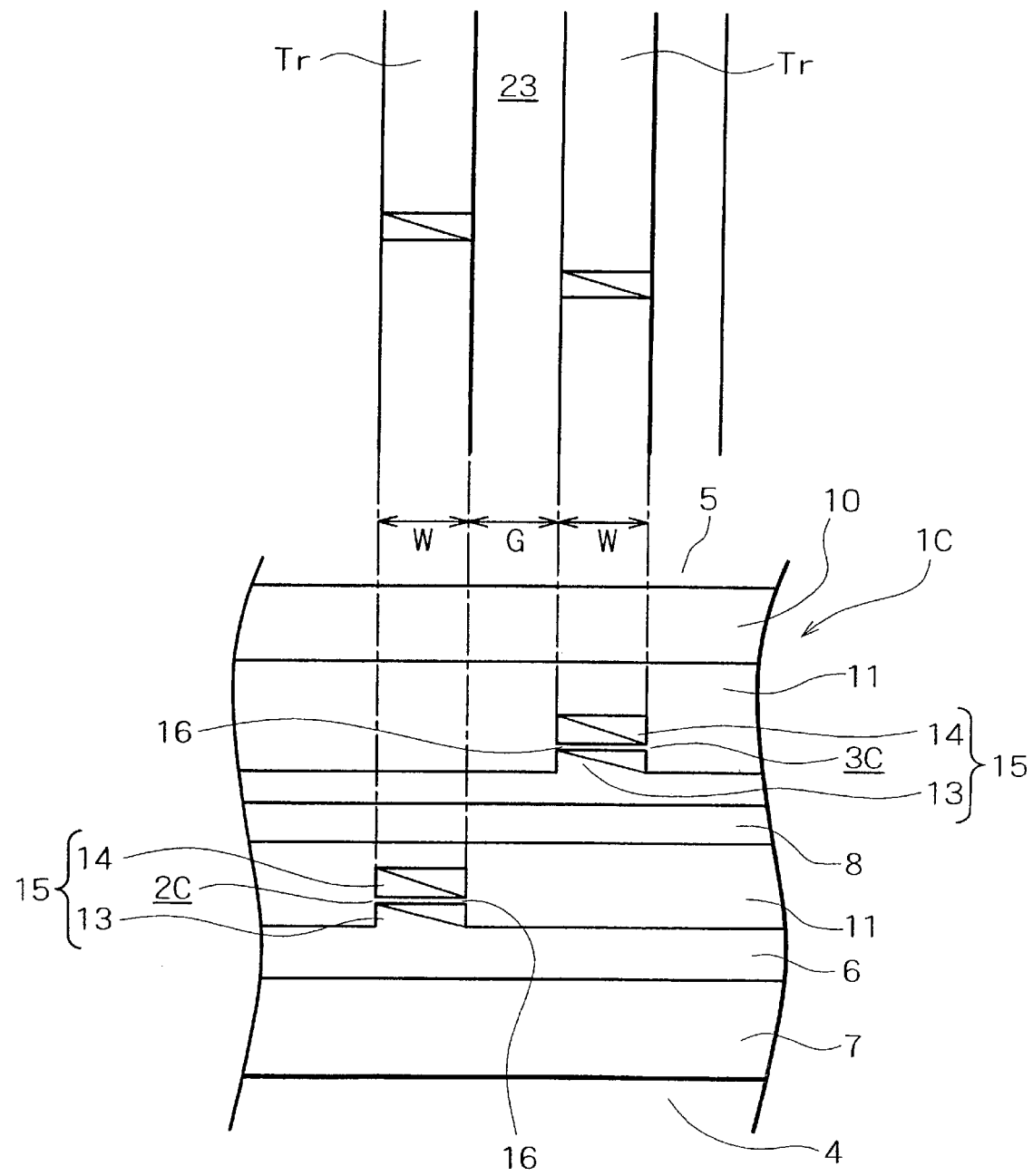
FIG. 10 is a view showing a positional relationship between thin film magnetic recording heads of the other multi-magnetic recording head shown in FIG. 8 and recording tracks.
Figure 11:
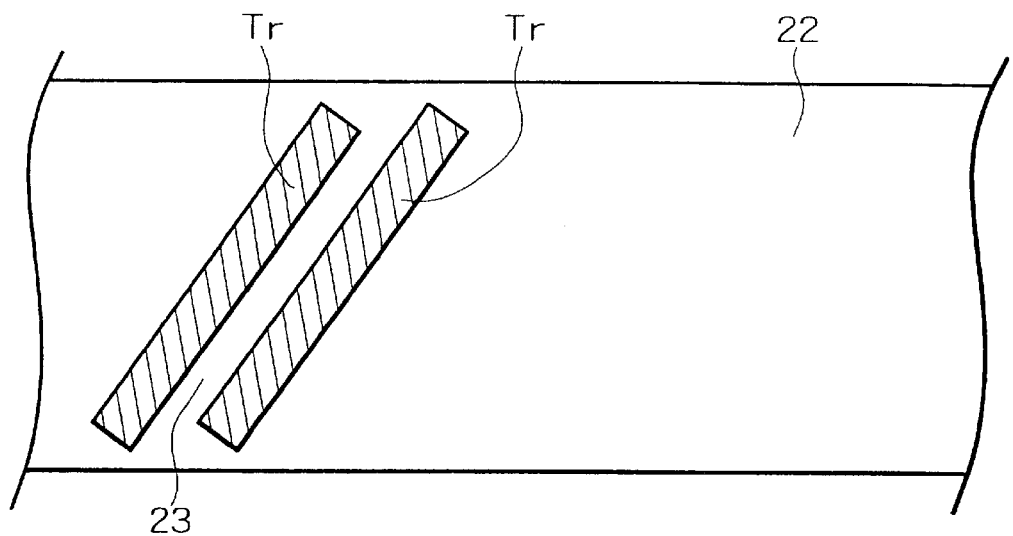
FIG. 11 is a view showing a state in which recording tracks are formed only by the one multi-magnetic recording head shown in FIG. 8.

The thin film magnetic recording heads 2C and 3C provided in the other multi-magnetic recording head 1C are formed at the same azimuth angle (for example, −azimuth angle) which is different from the azimuth angle (+azimuth angle) of the thin film magnetic recording heads 2B and 3B provided in the multi-magnetic recording head 1B (see FIG. 10).

Figure 12:
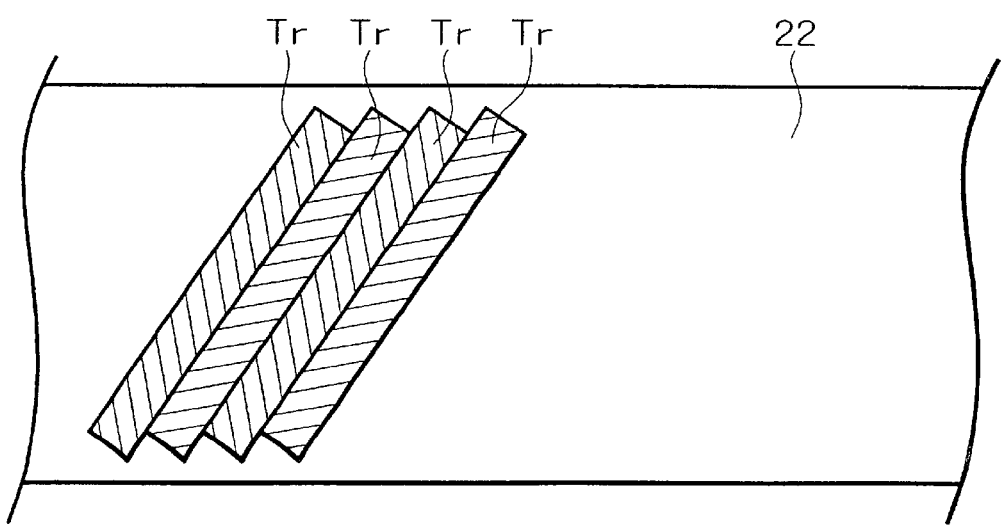
FIG. 12 is a view showing a state, continued from the state shown in FIG. 11, in which recording tracks are formed by the other multi-magnetic recording head shown in FIG. 8.

In the case of carrying out recording on the magnetic tape 22 by using the rotary drum 21 having the two multi-magnetic recording heads 1B and 1C, two recording tracks Tr are first formed with a unrecorded portion 23 put therebetween by the thin film magnetic recording heads 2B and 3B of the one multi-magnetic recording head 1B (see FIG. 11), and after the rotary drum 21 is rotated by 180°, other recording tracks Tr are formed by the thin film magnetic recording heads 2C and 3C of the other multi-magnetic recording head 1C (see FIG. 12).

At this time, of the thin film magnetic recording heads 2C and 3C of the other multi-magnetic recording head 1C, the thin film magnetic recording head 2C forms the recording track Tr on the unrecorded portion 23, and the thin film magnetic recording head 3C forms the recording track Tr on a portion adjacent to the already formed recording track Tr (see FIG. 12). In this way, on the unrecorded portions 23 formed by the thin film magnetic recording heads 2B and 3B (or 2C and 3C), the recording tracks Tr are formed by the thin film magnetic recording heads 2C and 3C (or 2B and 3B).

In this case, since the thin film magnetic recording heads 2B and 3B of the one multi-magnetic recording head 1B are formed at the +azimuth angle and the thin film magnetic recording heads 2C and 3C of the other multi-magnetic recording head 1C are formed at the −azimuth angle, it is possible to prevent occurrence of crosstalk between the recording track Tr formed by the one multi-magnetic recording head 1B and the recording track Tr formed by the other multi-magnetic recording head 1C. It is to be noted that azimuth is not an essential composing element. For example, if there occurs no problem even when the recording tracks Tr are close to each other, it is not required to give any azimuth to the thin film magnetic recording head. A magnetic recording apparatus including a plurality of multi-magnetic recording heads each including a plurality of thin film magnetic recording heads, each of which has no azimuth, relates to that described in claim 14.

In the third embodiment, the width of the unrecorded portion 23 is set to be nearly equal to the width of the thin film magnetic recording heads 2B and 3B (2C and 3C); however, the present invention is not limited thereto but may be configured as follows: namely, the width of the unrecorded portion 23, that is, the gap G between the two thin film magnetic recording heads 2B and 3B (2C and 3C) is set to be smaller than the width of the thin film magnetic recording heads 2B and 3B (2C and 3C), wherein a recording track Tr is recorded on the unrecorded portion 23 in such a manner as to partially overwrite the already formed recording track Tr adjacent to the unrecorded portion 23. In this case, to equalize the widths of the recording tracks Tr, the width of the over-write side thin film magnetic recording head may be previously formed at a smaller value.

To form the thin film magnetic recording heads of the multi-magnetic recording heads 1B or 1C at the same azimuth angle, a workpiece may be tilted at a specific angle when the magnetic poles of the thin film magnetic recording heads are laminated in the stacking step. With this manner, the thin film magnetic recording heads of the multi-magnetic recording heads 1B or 1C can be relatively easily formed at the same azimuth angle.

In the embodiments, the present invention is applied to the multi-magnetic recording head having the two thin film magnetic recording heads; however, the present invention can be also applied to a multi-magnetic recording head having three or more thin film magnetic recording heads.

In the embodiments, the present invention is applied to the magnetic recording head; however, the present invention can be also applied to a so-called merge type head having a recording head and a reproducing head.

Additionally, the other concrete shapes and structures of the magnetic recording heads in the embodiments are also illustrative purposes only, and therefore, the technical scope of the present invention should not be construed as limited thereto.

What is claimed is:

1. A multi-magnetic recording head comprising:

a substrate;

a pair of first thin film magnetic poles with a specific gap therebetween, which are stacked over said substrate; and a pair of second thin film magnetic poles with a specific gap therebetween, which are stacked over said pair of first thin film magnetic poles;

wherein, said pair of first thin film magnetic poles and said pair of second thin film magnetic poles are offset from each other in the direction nearly perpendicular to the stacking direction.

2. A multi-magnetic recording head according to claim 1, wherein, a magnetic shield layer is stacked between said pair of first thin film magnetic poles and said pair of second thin film magnetic poles.

3. A multi-magnetic recording head according to claim 1, wherein, a magnetic flux shield layer is stacked between said pair of first thin film magnetic poles and said pair of second thin film magnetic poles.

4. A multi-magnetic recording head according to claim 1, wherein, said pair of first thin film magnetic poles and said pair of second thin film magnetic poles are offset from each other in the width direction in such a manner that end portions of said pairs of first and second thin film magnetic poles are overlapped to each other as seen along the stacking direction.

5. A multi-magnetic recording head according to claim 1, wherein, said pair of first thin film magnetic poles and said pair of second thin film magnetic poles are offset from each other in the width direction in such a manner that any portions of said pairs of first and second magnetic poles are not overlapped to each other as seen along the stacking direction.

6. A magnetic recording method comprising the step of substantially simultaneously forming a plurality of recording tracks by using a multi-magnetic recording head, said multi-magnetic recording head comprising: a substrate; a pair of first thin film magnetic poles with a specific gap therebetween, which are stacked over said substrate; and a pair of second thin film magnetic poles with a specific gap therebetween, which are stacked over said pair of first thin film magnetic poles; wherein, said pair of first thin film magnetic poles and said pair of second thin film magnetic poles are offset from each other in the direction nearly perpendicular to the stacking direction.

7. A magnetic recording method according to claim 6, wherein, a plurality of recording tracks are substantially simultaneously formed by using said multi-magnetic recording head in which said pair of first thin film magnetic poles and said pair of second thin film magnetic poles are offset from each other in the width direction in such a manner that end portions of said pairs of first and second thin film magnetic poles are overlapped to each other as seen along the stacking direction.

8. A magnetic recording method according to claim 6, wherein, a plurality of recording tracks are substantially simultaneously formed by using said multi-magnetic recording head in which said pair of first thin film magnetic poles and said pair of second thin film magnetic poles are offset from each other in the width direction in such a manner that any portions of said pairs of first and second magnetic poles are not overlapped to each other as seen along the stacking direction.

9. A magnetic recording apparatus including a multi-magnetic recording head, said multi-magnetic recording head comprising:

a substrate;

a pair of first thin film magnetic poles with a specific gap therebetween, which are stacked over said substrate; and a pair of second thin film magnetic poles with a specific gap therebetween, which are stacked over said pair of first thin film magnetic poles;

wherein, said pair of first thin film magnetic poles and said pair of second thin film magnetic poles are offset from each other in the direction nearly perpendicular to the stacking direction.

10. A magnetic recording apparatus according to claim 9, wherein, a magnetic shield layer is stacked between said pair of first thin film magnetic poles and said pair of second thin film magnetic poles.

11. A magnetic recording apparatus according to claim 9, wherein, a magnetic flux shield layer is stacked between said pair of first thin film magnetic poles and said pair of second thin film magnetic poles.

12. A magnetic recording apparatus according to claim 9, wherein, said pair of first thin film magnetic poles and said pair of second thin film magnetic poles are offset from each other in the width direction in such a manner that end portions of said pairs of first and second thin film magnetic poles are overlapped to each other as seen along the stacking direction.

13. A magnetic recording apparatus according to claim 9, wherein, said pair of first thin film magnetic poles and said pair of second thin film magnetic poles are offset from each other in the width direction in such a manner that any portions of said pairs of first and second magnetic poles are not overlapped to each other as seen along the stacking direction.

14. A magnetic recording apparatus comprising:

at least two sets of multi-magnetic recording heads, each of which includes a plurality of thin film magnetic recording heads spaced from each other at specific intervals;

wherein, in use for recording, recording tracks with an unrecorded portion therebetween are formed by said thin film magnetic recording heads of one of said multi-magnetic recording heads, and a recording track is formed on said unrecorded portion by at least one of said thin film magnetic recording heads of another of said multi-magnetic recording heads.

15. A magnetic recording apparatus comprising:

at least two sets of multi-magnetic recording heads each of which includes a plurality of thin film magnetic recording heads spaced from each other at specific intervals;

wherein, in use for recording, recording tracks with an unrecorded portion put therebetween are formed by said thin film magnetic recording heads of one of said multi-magnetic recording heads, and a recording track is formed on said unrecorded portion by at least one of said thin film magnetic recording heads of another of said multi-magnetic recording heads, and said thin film magnetic recording heads of one of said multi-magnetic recording heads are formed at the same specific azimuth angle, and said thin film magnetic recording heads of another of said multi-magnetic recording heads are formed at an azimuth angle difference from said azimuth angle of said thin film magnetic recording heads of said one of said multi-magnetic recording heads.

* * * * *